United States Patent [19]

Asano

[11] 4,197,707
[45] Apr. 15, 1980

[54] LEAKAGE GAS RECIRCULATION SYSTEM FOR USE IN STIRLING ENGINE

[75] Inventor: Kenji Asano, Ageo, Japan

[73] Assignee: Nippon Piston Ring Co., Ltd., Tokyo, Japan

[21] Appl. No.: 921,678

[22] Filed: Jul. 3, 1978

[30] Foreign Application Priority Data

Jul. 6, 1977 [JP] Japan .................. 52-80545

[51] Int. Cl.² .............................................. F02G 1/06
[52] U.S. Cl. .................................................... 60/517
[58] Field of Search ................. 60/517, 521, 522, 525; 62/6

[56] References Cited

U.S. PATENT DOCUMENTS

| | | | |
|---|---|---|---|
| 3,667,348 | 6/1972 | Neelen | 60/517 X |
| 4,080,788 | 3/1978 | Kantz | 60/517 |
| 4,093,239 | 6/1978 | Sugahara | 60/517 X |

FOREIGN PATENT DOCUMENTS

1288528  9/1972  United Kingdom .................. 60/517

Primary Examiner—Allen M. Ostrager
Attorney, Agent, or Firm—Sughrue, Rothwell, Mion, Zinn and Macpeak

[57] ABSTRACT

A leakage gas return device for a Stirling engine includes a pumping cylinder divided into first and second chambers by a piston, one of the chambers for receiving leakage gas from the block seal through a first one way valve and returning the leakage gas to the engine cylinder through a second one way valve. The other chamber is first connected to a low pressure oil source to permit expansion of the first chamber by the leakage gas, and at bottom dead center the second chamber is connected to a high pressure oil source to thereby force the leakage gas back into the engine cylinder.

4 Claims, 3 Drawing Figures

LEAKAGE GAS RECIRCULATION SYSTEM FOR USE IN STIRLING ENGINE

BACKGROUND OF THE INVENTION

This invention relates to a leakage gas recirculation system for use in a Stirling engine, more particularly to a pumping device to return leaked gas into a cylinder chamber of a Stirling engine.

Stirling engines have received increasing attention in recent years owing to their high torque characteristics, clean exhaust gas, low noise, low fuel expense, low maintenance, and high durability as compared with a conventional gasoline engine. Furthermore, the thermal efficiency of a Stirling engine are equal or superior to those of the internal combustion engine because in a Stirling engine hydrogen or helium is used as the working fluid instead of air, whereby the temperature efficiency of the thermal heat exhangers are greatly improved.

However, since the hydrogen or helium working fluid has relatively small molecules, it is difficult to properly seal a Stirling engine. Stirling engines have exhibited high leakage in the sealing area between the cylinder wall and the piston rod. Conventional "rollsox" seals are reasonably effective but their durability is low due to the materials used therein.

In a recent trials, multiple seal rings are used to form a block seal portion, whereby the pressure of the working fluid is first reduced therein, so that seal durability is greatly enhanced. For the perfection of the sealability at the block seal portion, some plans or conceptions have been developed for returning the working liquid leaked from the block seal portion into the cylinder chamber of a Stirling engine. However, this is very difficult to accomplish effectively due to the lack of a suitable mechanism therefor.

SUMMARY OF THE INVENTION

It is therefore an object of this invention to provide a recirculation system for a working fluid leaking out of the block seal portion.

Briefly, and in accordance with the present invention, at least one pumping device is provided including a cylinder and a piston which divides the cylinder into two chambers. A first chamber has an end wall which is connected to a block seal portion of a Stirling engine by providing an intake passage to introduce leaked fluid into the chamber through a one way valve, and a discharge passage to return the leaked fluid into the cylinder of a Stirling engine through a second one way valve. The second chamber is connected to an oil tank by a single intake and discharge passage. Both end walls of the cylinder are respectively provided with contacts each of which contact the piston when the piston reaches bottom or top dead center to energize or deenergize a solenoid valve which is adapted to allow communication between the second chamber and high pressure oil source to supply oil into the chamber, thereby forcing the leaked gas back into the engine cylinder.

DETAILED DESCRIPTION OF THE INVENTION

Figure 2:
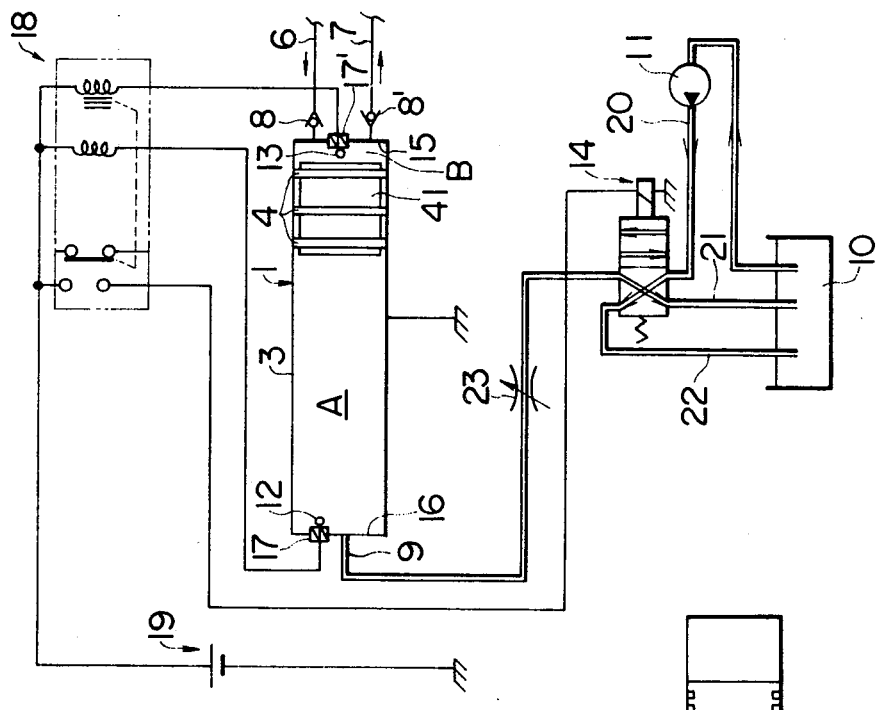
FIG. 2 shows in detail a recirculation system of FIG. 1 for a working liquid leaking out of the block seal portion according to the present invention, wherein oil introduction into the second chamber is terminated and the piston begins to move toward the second chamber.
Figure 1:
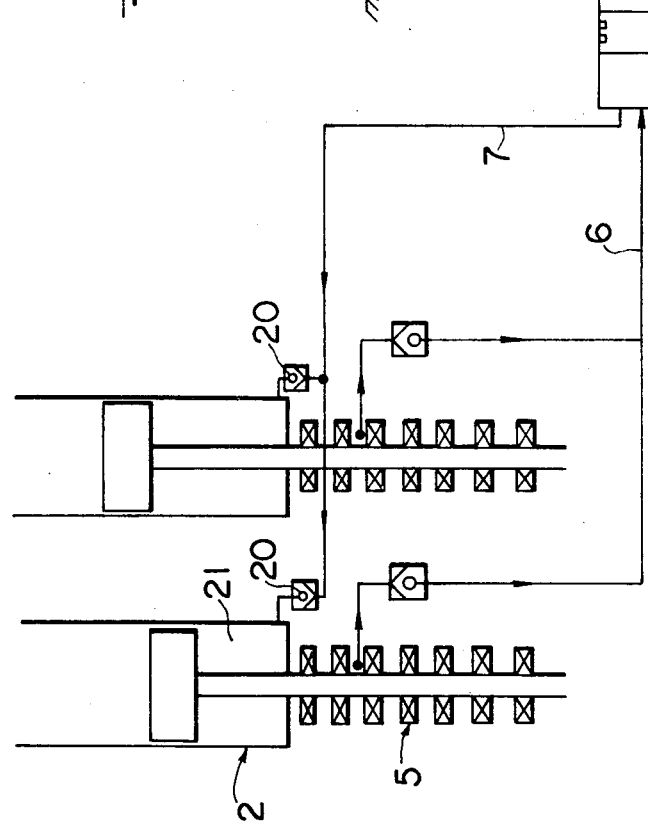
FIG. 1 is a schematic view showing the application of the system of the present invention into a Stirling engine.

The present invention will now be described in detail with reference to the accompanying drawings, wherein the pumping device 1 is connected to a Stirling engine 2 as shown in FIG. 1. Referring to FIG. 2, seal rings 4, 4, 4, are fitted on a piston 41 slidable in a cylinder 3. The piston 41 divides the cylinder into two chambers A and B. An end wall of the chamber B is provided with an intake passage 6 to allow leaked gas from the seal portion 5 into a chamber B through a one way valve 8 and discharge passage 7 to return the leaked fluid into a cylinder 21 of a Stirling engine 2 through a one way valve 8'. An end wall of the chamber A is provided with an oil intake and discharge passage 9 to intake and discharge oil into and from the chamber A. The passage 9 selectively connects to an oil tank 10 either directly or through an oil pump 11 to the tank 10 by the actuation of a solenoid valve 14 to be discussed later.

The cylinder 3 forms one of the electrodes and, since at least one of seal rings is made of electro-conductive metal, the piston 41 also forms part of the same electrode. End walls of the cylinder 3 are provided with contacts 12 and 13, respectively, to form the other electrodes around with insulators 17 and 17' are interposed to block the electric conduction between the contacts and the cylinder 3. The contacts connect the solenoid valve 14 through a keep relay 18. Reference numeral 19 designates a power source.

The solenoid valve 14 selectively connects the passage 9 with a passage 21 to allow oil communication between the chamber A and the oil tank 10 so that no oil pressure is applied to the chamber A, while simultaneously a passage 20 is connected to a passage 22. The solenoid 14 also selectively connects a passage 9 with a passage 20 to supply oil from the oil tank into the chamber A by an oil pump 11, while simultaneously passage 21 is connected to passage 22.

In operation, as shown in FIG. 2 the chamber A is in oil communication with the oil tank 10 through the passages 9 and 21, no oil pressure is applied to the chamber A. Therefore, if the fluid pressure of the leaked fluid from the block seal portion 5 is higher than the oil pressure in the chamber A the piston 41 is moved toward the chamber A to accumulate the leaked fluid in the chamber B through one way valve 8 and the intake passage 6. Normally, the movement of the piston toward the chamber A occurs when the leaked working fluid pressure exceeds 8 kg/cm$^2$ due to the piston movement resistive force due to the oil in the chamber A and force necessary to open the valve 8. The optimum pressure of the leaked working fluid ranges from 30 to 50 kg/cm$^2$. In FIG. 2, the passage 22 is in oil communication with the passage 20 through the oil pump 11, and oil is not supplied into the chamber A.

Figure 3:
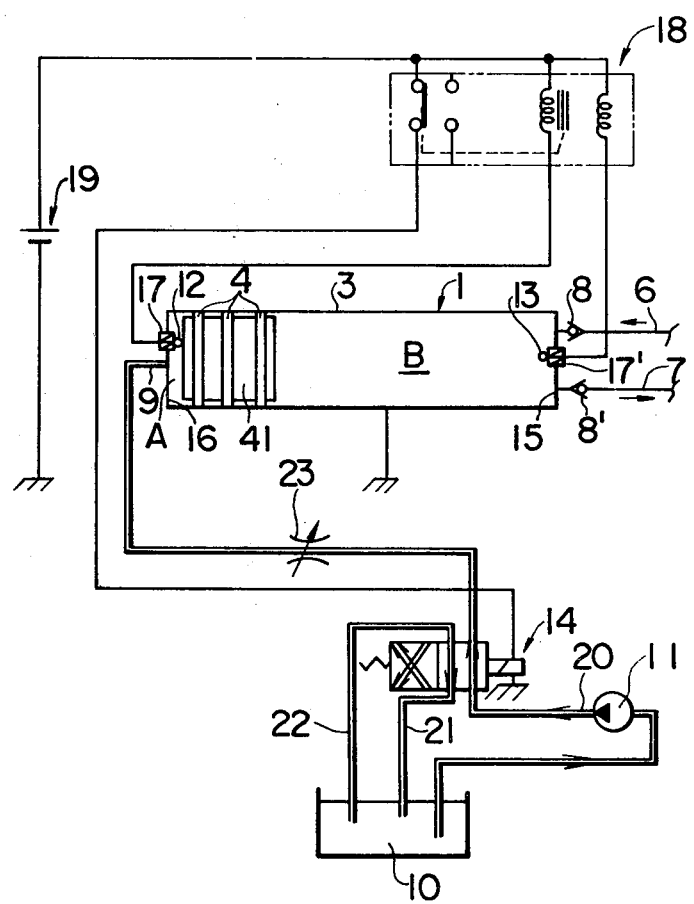
FIG. 3 shows a recirculation system according to the present invention, wherein the piston begins to move toward the first chamber.

When the piston 41 reaches a bottom dead center to contact the contact 12, the keep relay 18 is actuated, which in turn energize the solenoid valve. the energization of the solenoid valve 14 causes oil communication between the chamber A and the oil tank 10 through the passages 9, 20 and the oil pump 11 to positively introduce the oil into the chamber A as shown in FIG. 3. The oil pressure is predetermined to have a higher pressure than the minimum working pressure of a Stirling engine and, therefore, the oil pressure in the chamber A is higher than the leakage gas pressure in the chamber B thereby urging the piston 41 toward the chamber B so that the leaked gas is returned into the cylinder 21 of the Stirling engine through the discharge passage 7 and the one way valve 8'.

When the piston 41 reaches top dead center to contact the contact 13, the keep relay 18 is actuated oppositely, to thereby actuate the solenoid valve oppositely as shown in FIG. 2, so that leaked gas introduction into the chamber B is started.

The above mentioned operation is repeatedly accomplished whereby the leaked working gas is effectively returned into the cylinder of a Stirling engine.

If helium is employed as a working gas, the above mentioned contacts are usable. However, if hydrogen is used, these contacts should be replaced by non-contact or proximity switches in order to avoid the generation of a spark. It goes without saying that non-electrical contacts can be used instead of electrical contacts 12 and 13. Further, it is preferable to provide a throttle valve as indicated at 23 at the intake and discharge passage 9 to control sudden pressure surges.

According to the present invention, since the piston is merely moved by the pressure differential between the leaked gas pressure and the oil pressure, additional atmospheric pressure or working gas in the Stirling engine is not required, and only the leaked working gas is introduced into the chamber B and returned into cylinder of the engine, whereby perfect leaked gas return into a Stirling engine is realized.

What is claimed is:

1. A leakage gas return device for use in a Stirling engine having a block seal portion to form a seal between a cylinder of the Stirling engine and a piston rod, wherein the improvement is characterized in that said return device comprises:
    (a) a pumping cylinder and a piston disposed in said pumping cylinder and having at least one seal means for dividing said pumping cylinder into first and second chambers, said piston being slidable between a bottom dead center position at which the volume of said first chamber is a maximum and a top dead center position at which the volume of said second chamber is a maximum;
    (b) a leakage gas intake passage for providing leakage gas from said block seal portion into said first chamber through a first one way valve;
    (c) a leakage gas discharge passage for providing the leakage gas in said first chamber into a Stirling engine cylinder through a second one way valve;
    (d) a fluid intake and discharge passage connected to said second chamber and selectively communicating with a low pressure fluid source and a high pressure fluid source;
    (e) control means for providing communication between said fluid intake and discharge passage and said low pressure fluid source in response to a first control signal and providing communication between said fluid intake and discharge passage and said high pressure fluid source in response to a second control signal; and
    (f) switch means switchable between a first position when said piston reaches top dead center and a second position when said piston reaches bottom dead center, said switch means generating said first and second control signals when in its first and second positions, respectively, so that leakage gas from said leakage gas intake passage forces said piston to its bottom dead center position at which time high pressure fluid introduced into said second chamber forces the leakage gas out of said first chamber into said Stirling engine cylinder until said piston reaches top dead center.

2. A leakage gas return device as claimed in claim 1, wherein said fluid is oil.

3. A leakage gas return device as claimed in claims 1 or 2, wherein said control means comprises a solenoid-operated valve having for providing said selective connections between said intake and discharge passage and said low and high pressure fluid sources, and wherein said switch means comprises switches positioned at either end of said pumping cylinder and connected to said solenoid operated valve for providing said first and second control signals.

4. A leakage gas return device as claimed in claim 3, wherein said switches are proximity switches.

* * * * *